(12) United States Patent
Fujinaka et al.

(10) Patent No.: US 8,373,934 B2
(45) Date of Patent: Feb. 12, 2013

(54) LENS BARREL

(75) Inventors: Hiroyasu Fujinaka, Osaka (JP);
Tetsuya Uno, Osaka (JP)

(73) Assignee: Panasonic Corporation, Osaka (JP)

( * ) Notice: Subject to any disclaimer, the term of this patent is extended or adjusted under 35 U.S.C. 154(b) by 40 days.

(21) Appl. No.: 13/158,606

(22) Filed: Jun. 13, 2011

(65) Prior Publication Data

US 2011/0304924 A1    Dec. 15, 2011

(30) Foreign Application Priority Data

Jun. 14, 2010  (JP) ................................ 2010-134769

(51) Int. Cl.
*G02B 15/14* (2006.01)
(52) U.S. Cl. ........................................ 359/694; 359/700
(58) Field of Classification Search .......... 359/694–704, 359/705, 706, 817, 822, 823, 825, 826; 396/379
See application file for complete search history.

(56) References Cited

U.S. PATENT DOCUMENTS

| 5,376,983 | A | 12/1994 | Yamazaki et al. | |
| 6,657,795 | B2 * | 12/2003 | Nishimura et al. | ........... 359/699 |
| 2010/0020413 | A1 | 1/2010 | Sato | |

FOREIGN PATENT DOCUMENTS

| JP | 04-353811 | | 12/1992 |
| JP | 08-254644 | | 10/1996 |
| JP | 2003-227989 | A | 8/2003 |
| JP | 2003-279827 | A | 10/2003 |
| JP | 2004-177812 | A | 6/2004 |
| JP | 2005-308852 | | 11/2005 |
| JP | 2006-208618 | | 8/2006 |
| JP | 2007-192962 | | 8/2007 |
| JP | 2010-008802 | | 1/2010 |
| JP | 2010-066293 | A | 3/2010 |

* cited by examiner

*Primary Examiner* — James Jones
(74) *Attorney, Agent, or Firm* — Renner, Otto, Boisselle & Sklar, LLP (57) ABSTRACT

A lens barrel includes a zoom optical system in which a focal distance is changeable; a first group frame moving together with the first lens group; and first and second cam mechanisms transmitting drive force to the first group frame. In a zoom region, each of a first group cam groove and a cam slot includes a first section, a second section which adjoins the first section and has an absolute value of a gradient smaller than that of the first section, and the third section which adjoins the second section and has the absolute value of the gradient larger than that of the second section, and in which a sign of the gradient is the same as that of the first section. A distance from an imaging surface to the first group frame in the optical axis direction has a local minimum in the second section.

4 Claims, 5 Drawing Sheets

LENS BARREL

CROSS-REFERENCE TO RELATED APPLICATION

This application claims priority to Japanese Patent Application No. 2010-134769 filed on Jun. 14, 2010, the entire disclosure of which is incorporated by reference herein. In addition, this application is related to Japanese Patent Application No. 2011-119594 filed on May 27, 2011, the entire disclosure of which is incorporated by reference herein.

BACKGROUND

A technique disclosed herein relates to a lens barrel.

Conventionally, a lens barrel has been known, in which a position of a lens group is adjustable. As one of the lens barrels of this type, there is a lens barrel disclosed in Japanese Patent Publication No. 2010-008802. The lens barrel disclosed in Japanese Patent Publication No. 2010-008802 includes a first frame holding lenses, a second frame in which the first frame is housed, and a third frame in which the second frame is housed. Drive force driving such frames is transmitted from the third frame to the second frame through a second cam mechanism, and then is transmitted from the second frame to the first frame through a first cam mechanism. Each of the first and second cam mechanisms includes a cam follower and a cam groove to be engaged with the cam follower. Each of the cam grooves of the first and second cam mechanisms has a predetermined locus. The first frame moves in an optical axis direction according to shapes of the cam grooves of the first and second cam mechanisms.

SUMMARY

There is a lens barrel in which, when a focal distance is changed from a wide-angle end to a tele end, not only a first frame simply moves toward an object, but also the first frame moves toward the object after the first frame temporarily moves toward an imaging surface. That is, in the lens barrel, the first frame moves along a locus in which a distance from the imaging surface to the first frame has a local minimum. In the lens barrel having such a configuration, when the focal distance is set between the wide-angle end and the tele end, if an impact is applied to the first frame due to, e.g., dropping of the lens barrel etc., the first frame is pushed to a position where the distance from the imaging surface to the first frame is the local minimum. In such a position, impact force is transmitted to a second frame through a first cam mechanism, and is further transmitted to a third frame through a second cam mechanism. In such a state, force in a rotational direction may act on the first or second frame due to component force of the impact force transmitted from a cam follower to a cam groove. As a result, there is a possibility that the first to third frames and members therearound are damaged.

The technique disclosed herein has been made in view of the foregoing, and it is an objective of the technique to provide a lens barrel having high strength against external force.

A lens barrel disclosed herein includes a zoom optical system including a plurality of lens groups each having one or more lenses, in which a focal distance is changeable between a wide-angle end and a tele end by moving the lens groups along an optical axis; a first frame moving together with a first lens group of the plurality of lens groups and which is closest to an object in the zoom optical system; and first and second cam mechanisms transmitting drive force to the first frame. Each of the first and second cam mechanisms includes a cam follower and a cam groove engaged with the cam follower, and the cam groove includes a section in which the cam follower moves when the focal distance is changed between the wide-angle end and the tele end. The section of at least one of the cam grooves of the first and second cam mechanisms includes a first section which has a predetermined gradient to a circumferential direction about the optical axis, a second section which adjoins the first section and has an absolute value of a gradient smaller than that of the first section, and a third section which adjoins the second section and has an absolute value of a gradient larger than that of the second section, and in which a sign of the gradient is the same as that of the first section. A distance from an imaging surface to the first frame in the optical axis direction has a local minimum when the cam follower for the at least one of the cam grooves is positioned within the second section.

According to the lens barrel, the lens barrel having high strength against external force can be provided.

DETAILED DESCRIPTION

Figure 1:
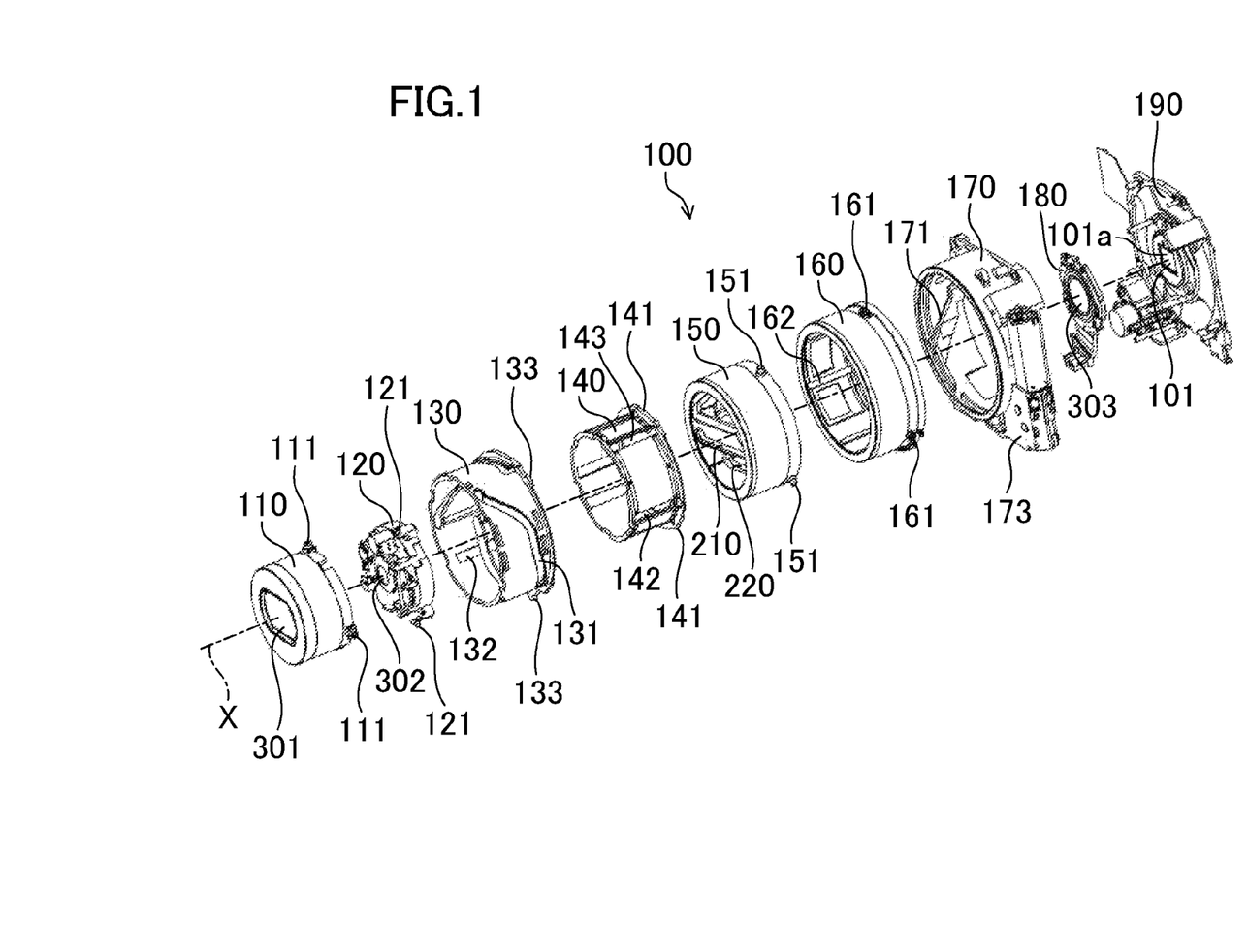
FIG. 1 is an exploded perspective view of a lens barrel of a first embodiment.

Example embodiments will be described below in detail with reference to the drawings. FIG. 1 is an exploded perspective view of a lens barrel of the embodiment.

First Embodiment

A lens barrel 100 of a first embodiment is mounted in a digital still camera. The lens barrel 100 includes a master flange 190, various frames which will be described below, a zoom optical system formed by lenses held by the frames, and an imaging device 101 configured to convert light entering the imaging device 101 through the zoom optical system into an electrical signal and output the electrical signal. The lens barrel 100 is one example, and can be mounted not only in the digital still camera but also in a camcorder, a camera-equipped cell-phone, etc. The zoom optical system includes a first lens group 301, a second lens group 302, and a focus lens group 303. The first lens group 301 is positioned closest to an object. Each of the first lens group 301, the second lens group 302, and the focus lens group 303 includes one or more lenses. The zoom optical system forms an optical image of an object on an imaging surface 101a of the imaging device 101. The first lens group 301 forms a first lens group, and the second lens group 302 forms a second lens group.

As the various frames, the lens barrel 100 includes a first group frame 110 holding the first lens group 301, a second group frame 120 holding the second lens group 302, a cam slot frame 130, a translational frame 140, a cam frame 150, a drive frame 160, a fixed frame 170, and a third group frame 180 holding the focus lens group 303. The first group frame 110, the second group frame 120, the cam slot frame 130, the translational frame 140, the cam frame 150, the drive frame 160, the fixed frame 170, and the third group frame 180 are concentrically arranged about an optical axis X. The first group frame 110 forms a first frame, and the cam frame 150 forms a second frame. In addition, the drive frame 160 forms a third frame.

The imaging device 101 is fixed to the master flange 190 so that the imaging surface 101a of the imaging device 101 faces the object. In addition, the fixed frame 170 is fixed to the master flange 190. A fixed cam groove 171 extending in a predetermined pattern and having a bottom, and a translational groove extending in an optical axis direction (or along the optical axis X) and having a bottom are formed in an inner circumferential surface of the fixed frame 170. A zoom motor unit 173 is attached to the fixed frame 170. In the present specification, unless otherwise described, a "groove" includes a groove having a bottom and a groove not having a bottom. In addition, unless otherwise described, a "slot" means a groove not having a bottom.

A drive cam follower 161 and a gear portion are provided on an outer circumferential surface of the drive frame 160. The drive frame 160 is housed in the fixed frame 170. In such a state, the drive cam follower 161 of the drive frame 160 is engaged with the fixed cam groove 171 of the fixed frame 170, and the gear portion of the drive frame 160 is engaged with the zoom motor unit 173. The drive frame 160 is rotatably driven about the optical axis by the zoom motor unit 173. The drive frame 160 relatively moves in the optical axis direction while relatively rotating about the optical axis with respect to the fixed frame 170 according to the fixed cam groove 171. A circumferential groove extending in a circumferential direction and having a bottom, and a translational groove 162 extending in the optical axis direction and having a bottom are formed in an inner circumferential surface of the drive frame 160. When a term "rotate" is simply used below, it means a rotation about the optical axis.

A first engagement protrusion 133 to be engaged with the translational groove of the fixed frame 170, and a second engagement protrusion to be engaged with the circumferential groove of the drive frame 160 are provided on an outer circumferential surface of the cam slot frame 130. The cam slot frame 130 is housed in the drive frame 160. In such a state, the second engagement protrusion of the cam slot frame 130 is engaged with the circumferential groove of the drive frame 160. This allows the cam slot frame 130 to relatively rotate with respect to the drive frame 160, and not to relatively move in the optical axis direction with respect to the drive frame 160. That is, the cam slot frame 130 moves together with the drive frame 160 in the optical axis direction. The cam slot frame 130 housed in the drive frame 160 is further housed in the fixed frame 170. In such a state, the first engagement protrusion 133 is engaged with the translational groove of the fixed frame 170. Since the translational groove of the fixed frame 170 extends in the optical axis direction, the cam slot frame 130 is supported so as to move in the optical axis direction in a state in which the cam slot frame 130 cannot relatively rotate with respect to the fixed frame 170. A cam slot 131 extending in a predetermined pattern is formed in the cam slot frame 130. In addition, a translational groove 132 extending in the optical axis direction and having a bottom is formed in an inner circumferential surface of the cam slot frame 130.

Cam followers 151 are provided on an outer circumferential surface of the cam frame 150. The cam frame 150 is housed in the cam slot frame 130. In such a state, the cam followers 151 of the cam frame 150 penetrate the cam slot 131 of the cam slot frame 130, and are engaged with the translational groove 162 of the drive frame 160. In this manner, the cam frame 150 is held so as to rotate together with the drive frame 160 and translationally and relatively move in the optical axis direction with respect to the drive frame 160. In addition, the cam followers 151 are also engaged with the cam slot 131 of the cam slot frame 130. Thus, when the drive frame 160 is rotatably driven, the cam frame 150 relatively moves in the optical axis direction while relatively rotating with respect to the cam slot frame 130 according to a shape of the cam slot 131. First group cam grooves 210 each having a bottom and second group cam grooves 220 each having a bottom are provided in an inner circumferential surface of the cam frame 150. In addition, engagement protrusions are provided on the inner circumferential surface of the cam frame 150.

The translational frame 140 is housed in the cam frame 150. A circumferential groove extending in the circumferential direction and having a bottom is formed in an outer circumferential surface of the translational frame 140. The engagement protrusions of the cam frame 150 are engaged with the circumferential groove. The engagement of the engagement protrusions with the circumferential groove allows the translational frame 140 to relatively rotate with respect to the cam frame 150, and not to relatively move in the optical axis direction with respect to the cam frame 150. That is, when the cam frame 150 moves in the optical axis direction and rotates, the translational frame 140 moves together with the cam frame 150 in the optical axis direction. The translational frame 140 includes engagement protrusions 141 outwardly protruding from a rear end portion of the translational frame 140. The rear end portion of the translational frame 140 protrudes beyond the cam frame 150, and the engagement protrusion 141 is engaged with the translational groove 132 of the cam slot frame 130. The engagement of the engagement protrusion 141 with the translational groove 132 allows the translational frame 140 not to relatively rotate with respect to the cam slot frame 130. In addition, translational slots 142, 143 are formed in the translational frame 140.

The first group frame 110 includes first group cam followers 111. The first group frame 110 is housed in the translational frame 140. The first group frame 110 is engaged with the translational slots 142 of the translational frame 140. The first group frame 110 is translationally and relatively movable in the optical axis direction with respect to the translational frame 140, and does not relatively rotate with respect to the translational frame 140. The first group cam followers 111 are engaged with the first group cam grooves 210 of the cam frame 150. When the cam frame 150 rotates, the first group frame 110 relatively moves in the optical axis direction and relatively rotates with respect to the cam frame 150 through a first cam mechanism formed by the first group cam follower 111 and the first group cam groove 210.

The second group frame 120 includes second group cam followers 121. The second group frame 120 is housed in the translational frame 140. The second group frame 120 is engaged with the translational slot 143 of the translational frame 140. The second group frame 120 is translationally and relatively movable in the optical axis direction with respect to the translational frame 140, and does not relatively rotate with respect to the translational frame 140. The second group cam followers 121 are engaged with the second group cam grooves 220 of the cam frame 150. When the cam frame 150 rotates, the second group frame 120 relatively moves in the optical axis direction with respect to the cam frame 150 and relatively rotates with respect to the cam frame 150 through a second cam mechanism formed by the second group cam follower 121 and the second group cam groove 220.

The third group frame 180 is slidably engaged with a guide pole provided in the master flange 190. The third group frame 180 is driven separately from other frames in the optical axis direction by an actuator provided in the master flange 190.

The cam groove 171 of the fixed frame 170, the cam slot 131 of the cam slot frame 130, and the first group cam groove 210 and the second group cam groove 220 of the cam frame 150 are set so as to have a proper shape corresponding to a rotational angle. Thus, the first lens group 301 and the second lens group 302 can be arranged in proper positions corresponding to a rotation amount of the drive frame 160. In addition, the length of the lens barrel 100 in the optical axis direction when the lens barrel 100 is not in a shootable state (i.e., in a retracted state) can be shortened.

In the lens barrel 100 configured as described above, when the zoom motor unit 173 rotatably drives the drive frame 160, the first group frame 110 and the second group frame 120 move in the optical axis direction. This adjusts a focal distance in the zoom optical system. In addition to the foregoing, the third group frame 180 is moved to a proper position based on a distance between the object and the lens barrel 100. In such a manner, light enters the imaging device 101 to form an image on the imaging device 101, and such an image is captured.

Figure 2:
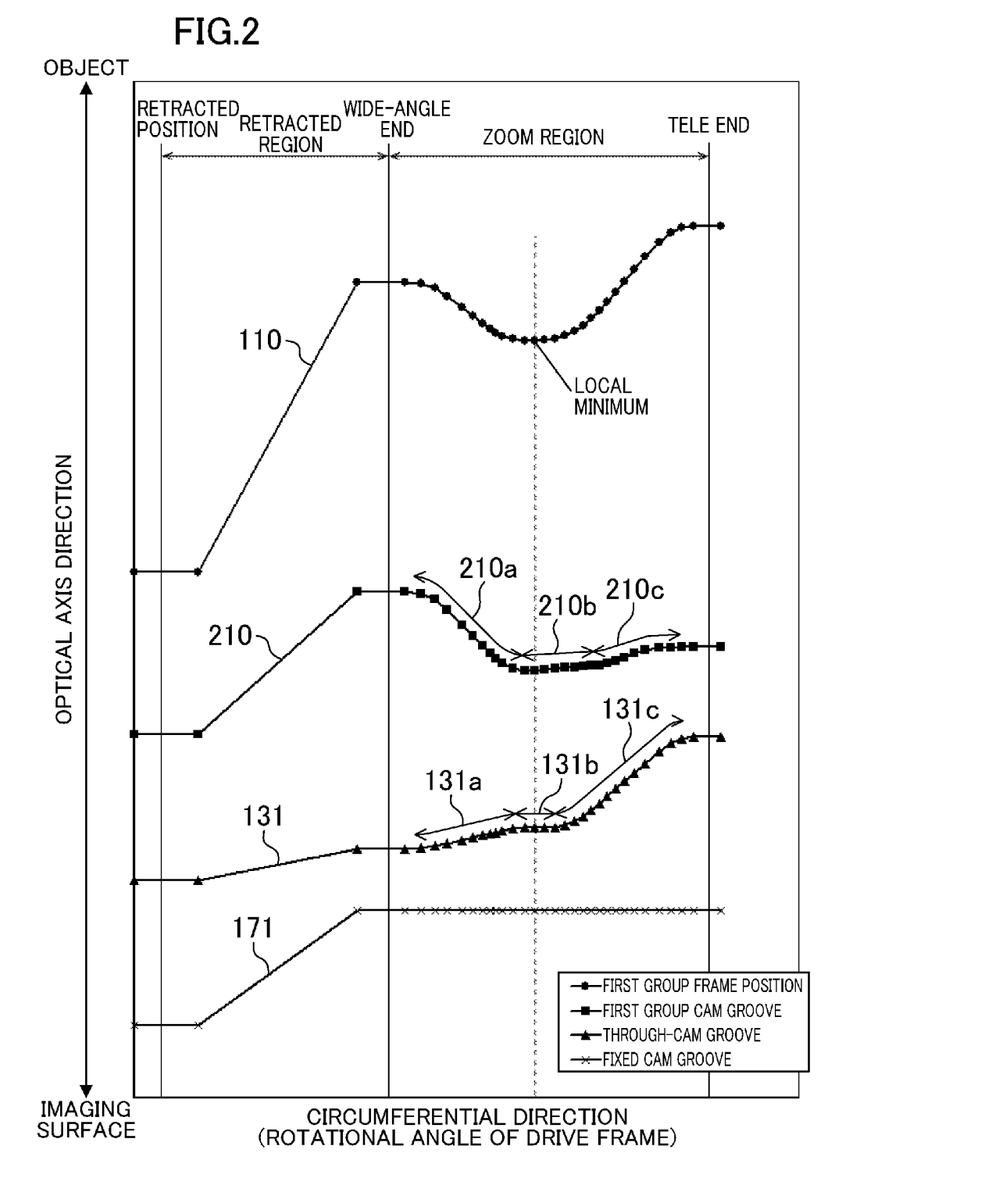
FIG. 2 illustrates a locus of a first group frame in an optical axis direction relative to a rotation amount, and development diagrams of a fixed cam groove, a cam slot, and a first group cam groove.

Subsequently, movement of the first group frame 110 will be described in detail. FIG. 2 illustrates a locus of the first group frame 110 in a case where a rotation amount of the drive frame 160 is plotted along a horizontal axis, and a position of the first group frame moving from a retracted position to a tele end through a wide-angle end in the optical axis direction relative to the rotation amount is plotted along a vertical axis. In addition, FIG. 2 illustrates development diagrams of the fixed cam groove 171, the cam slot 131, and the first group cam groove 210 so that the retracted position, the wide-angle end, and the tele end of each of the development diagrams correspond to those of the locus.

As described above, drive force of the zoom motor unit 173 is first transmitted to the drive frame 160. According to the drive cam follower 161 and the fixed cam groove 171, the drive frame 160 moves in the optical axis direction while relatively rotating with respect to the fixed frame 170. Meanwhile, the drive force is transmitted from the drive frame 160 to the cam frame 150 through the cam followers 151 and the cam slot 131. As a result, the cam frame 150 relatively moves in the optical axis direction with respect to the drive frame 160 while rotating together with the drive frame 160. Further meanwhile, the drive force is transmitted from the cam frame 150 to the first group frame 110 through the first group cam grooves 210 and the first group cam followers 111. As a result, the first group frame 110 moves in the optical axis direction while relatively rotating with respect to the drive frame 160. Switching of a rotational direction of the drive frame 160 allows switching of the first group frame 110 between movement toward the object and movement toward the imaging surface.

A displacement of the first group frame 110 in the optical axis direction is determined by a sum of a displacement of the drive cam follower 161 moving along the fixed cam groove 171 in the optical axis direction, a displacement of the cam follower 151 moving along the cam slot 131 in the optical axis direction, and a displacement of the first group cam follower 111 moving along the first group cam groove 210 in the optical axis direction. Loca of the drive cam follower 161, the cam follower 151, and the first group cam follower 111 are defined in accordance with shapes of the fixed cam groove 171, the cam slot 131, and the first group cam groove 210, respectively.

Each of the fixed cam groove 171, the cam slot 131, and the first group cam groove 210 has a zoom region and a retracted region. The zoom region is a region where each of the cam followers is movable when an object image is zoomed in/out for shooting. The zoom region corresponds to a section in which each of the cam followers moves when the focal distance is changed between the wide-angle end and the tele end. On the other hand, the retracted region is a region where each of the cam followers moves when the lens barrel 100 is changed from a shooting state to the retracted state. One of end portions of the zoom region closer to the retracted region is the wide-angle end, and the other end portion of the zoom region apart from the retracted region is the tele end. In addition, an end portion of the retracted region apart from the zoom region is the retracted position. In the retracted position, the frames are retracted, and the lens barrel 100 is in the retracted state. In any of the fixed cam groove 171, the cam slot 131, and the first group cam groove 210, the retracted position, the wide-angle end, and the tele end are arranged in this order from one side to the other side in the circumferential direction. That is, when the drive cam follower 161 is at the retracted position of the fixed cam groove 171, the cam follower 151 is also at the retracted position of the cam slot 131, and the first group cam follower 111 is also at the retracted position of the first group cam groove 210. When the drive cam follower 161 is at the wide-angle end of the fixed cam groove 171, the cam follower 151 is also at the wide-angle end of the cam slot 131, and the first group cam follower 111 is also at the wide-angle end of the first group cam groove 210. When the drive cam follower 161 is at the tele end of the fixed cam groove 171, the cam follower 151 is also at the tele end of the cam slot 131, and the first group cam follower 111 is also at the tele end of the first group cam groove 210. Each of the fixed cam groove 171, the cam slot 131, and the first group cam groove 210 has a shape parallel to the circumferential direction at the retracted position, the wide-angle end, and the tele end. Note that, regarding the shape of the cam groove and the locus of the cam follower, when a change in position from the imaging surface to the object in the optical axis direction indicates a positive displacement and a change in position from the wide-angle end to the tele end in the circumferential direction indicates a positive displacement, a ratio of a change amount of a position in the optical axis direction to a change amount of a position in the circumferential direction (the change amount of the position in the optical axis direction/the change amount of the position in the circumferential direction) is referred to as a "gradient" in the present specification. In other words, the "gradient" of the cam groove and the "gradient" of the locus of the cam follower mean an inclination to the circumferential direction about the optical axis. The gradient in a case where the cam follower is positioned closer to the object in the optical axis direction as the cam follower moves toward the tele end in the circumferential direction indicates a positive gradient, and the gradient in a case where the cam follower is positioned closer to the imaging surface in the optical axis direction as the cam follower moves toward the tele end in the circumferential direction indicates a negative gradient.

The fixed cam groove 171 obliquely and linearly extends from the retracted position to the wide-angle end and the object in the retracted region. In addition, the fixed cam groove 171 substantially extends parallel to the circumferential direction from the wide-angle end to the tele end in the zoom region. That is, the drive cam follower 161 does not move in the optical axis direction while moving in the zoom region of the fixed cam groove 171.

The cam slot 131 obliquely and linearly extends from the retracted position to the wide-angle end and the object in the retracted region. In addition, the cam slot 131 obliquely extends from the wide-angle end to the tele end and the object in the zoom region, and substantially extends parallel to the circumferential direction (i.e., substantially extends parallel to a plane perpendicular to the optical axis) toward the tele end in the middle of the zoom region. Then, the cam slot 131 obliquely extends toward the tele end and the object again, and reaches the tele end. Specifically, the cam slot 131 in the zoom region includes the following from the wide-angle end to the tele end: a first section 131a having the positive gradient, a second section 131b in which an absolute value of the gradient is smaller than that of the first section 131a, and a third section 131c in which a sign of the gradient is positive as in the first section 131a, and the absolute value of the gradient is larger than that of the second section 131b. More specifically, the second section 131b includes a portion which is substantially parallel to the circumferential direction. The first section 131a includes an inflection point at which a change in gradient is turned from an increase to a decrease. In addition, the second section 131b includes an inflection point at which the change in gradient is turned from the decrease to the increase. Further, the third section 131c includes an inflection point at which the change in gradient is turned from the increase to the decrease. That is, when the cam follower 151 moves along the cam slot 131 from the wide-angle end to the tele end, the cam follower 151 moves toward the object in the optical axis direction, the displacement of the cam follower 151 in the optical axis direction becomes temporarily zero or extremely small, and the cam follower 151 moves toward the object in the optical axis direction again.

The first group cam groove 210 obliquely and linearly extends from the retracted position to the wide-angle end and the object in the refracted region. In addition, the first group cam groove 210 obliquely extends from the wide-angle end to the tele end and the imaging surface in the zoom region, and then substantially extends parallel to the circumferential direction toward the tele end. Subsequently, the first group cam groove 210 obliquely extends toward the tele end and the object, and reaches the tele end. Specifically, the first group cam groove 210 in the zoom region includes the following in the order from the wide-angle end: a first section 210a having the negative gradient, a second section 210b in which the absolute value of the gradient is smaller than that of the first section 210a, and a third section 210c having the positive gradient, in which the absolute value of the gradient is larger than that of the second section 210b. More specifically, the second section 210b includes a portion which is substantially parallel to the circumferential direction. The first section 210a includes an inflection point at which the change in gradient is turned from the decrease to the increase. In addition, the third section 210c includes an inflection point at which the change in gradient is turned from the increase to the decrease. That is, when the first group cam follower 111 moves along the first group cam groove 210 from the wide-angle end to the tele end, the first group cam follower 111 moves toward the imaging surface in the optical axis direction, the displacement of the first group cam follower 111 in the optical axis direction becomes temporarily zero, and the first group cam follower 111 moves toward the object in the optical axis direction.

As described above, in the zoom region, drive force in the rotational direction from the zoom motor unit 173 is transmitted from the drive frame 160 to the cam frame 150 as drive force in the rotational direction and the optical axis direction through the second cam mechanism formed by the cam slot 131 and the cam follower 151. Further, the drive force transmitted to the cam frame 150 is transmitted to the first group frame 110 as drive force in the optical axis direction through the first cam mechanism formed by the first group cam groove 210 and the first group cam follower 111. As a result, the first group frame 110 is driven in the optical axis direction.

The locus of the first group frame 110 according to the fixed cam groove 171, the cam slot 131, and the first group cam groove 210 in the optical axis direction relative to the rotation of the drive frame 160 is illustrated in FIG. 2. That is, according to the locus, the first group frame 110 is linearly displaced from the retracted position to the wide-angle end toward the object in the optical axis direction in the refracted region. In addition, in the zoom region, the first group frame 110 is displaced from the wide-angle end to the tele end toward the imaging surface in the optical axis direction, and then the displacement of the first group frame 110 in the optical axis direction becomes zero (i.e., the displacement in the optical axis direction becomes a local minimum). Subsequently, the first group frame 110 is displaced toward the object in the optical axis direction.

Actual movement of the first group frame 110 will be described. When the first group frame 110 moves from the refracted position to the wide-angle end, the first group frame 110 linearly moves toward the object in the optical axis direction relative to the rotation amount of the drive frame 160. When the first group frame 110 moves from the wide-angle end to the tele end, the first group frame 110 temporarily moves toward the imaging surface in the optical axis direction, the displacement in the optical axis direction becomes zero, and the first group frame 110 moves toward the object in the optical axis direction. Note that the first group frame 110 is less likely to move in the optical axis direction at and near the retracted position, the wide-angle end, and the tele end.

As in the foregoing, the position of the first group frame 110 displaced in the optical axis direction relative to the rotation amount of the drive frame 160 has the local minimum in the zoom region. In other words, a distance from the imaging surface 101a to the first group frame 110 in the optical axis direction, which is changed relative to the rotation amount of the drive frame 160 has the local minimum in the zoom region. When the distance is the local minimum, the cam follower 151 is positioned in the second section 131b of the cam slot 131, and the first group cam follower 111 is positioned in the second section 210b of the first group cam groove 210. That is, the cam follower 151 is positioned in a portion of the cam slot 131, which is substantially parallel to the circumferential direction, and the first group cam follower 111 is positioned in a portion of the first group cam groove 210, which is substantially parallel to the circumferential direction. Note that the fixed cam groove 171 in which the drive cam follower 161 is positioned is parallel to the circumferential direction in the zoom region. Thus, in a state in which the value for the position of the first group frame 110 in the optical axis direction is the local minimum, even if external force in the optical axis direction acts on the first group frame 110, little component force in the rotational direction about the optical axis acts on the first group frame 110, the cam slot frame 130, the cam frame 150, and the drive frame 160. When an impact is applied to the lens barrel 100 due to, e.g., dropping of the lens barrel 100 in the shootable state, and bumping of the lens barrel 100 against a wall etc. (in particular, when the impact acts on the first group frame 110), external force in a direction in which the length of the lens barrel 100 is shortened acts on the lens barrel 100. Then, the first group frame 110 is pushed toward the imaging surface in the optical axis direction until the first group frame 110 reaches the position where the distance from the imaging surface 101a to the first group frame 110 in the optical axis direction is the local minimum. Since the first group frame 110 cannot further move toward the imaging surface beyond such a position, impact force and its reaction force act on the first group cam follower 111 and the first group cam groove 210 in this state. Similarly, the impact force and the reaction force act on the cam follower 151, the cam slot 131, and the translational groove 162. However, the first group cam follower 111 is positioned in the portion of the first group cam groove 210, which is substantially parallel to the circumferential direction, and the cam follower 151 is positioned in the portion of the cam slot 131, which is substantially parallel to the circumferential direction. Thus, most of the impact force acts on the first group frame 110, the cam frame 150, and the cam slot frame 130 in the optical axis direction, and does not act in the rotational direction. Suppose that great impact force in the rotational direction acts on the first group frame 110. Such great impact force in the rotational direction also acts on the translational frame 140 engaged with the first group frame 110. Thus, there is a possibility that the engagement protrusion 141 engaged with the translational groove 132 of the cam slot frame 130 is damaged. If great force in the rotational direction acts on the cam slot 131, there is a possibility that the engagement protrusion 141 of the translational frame 140, which is engaged with the translational groove 132 is damaged, and the first engagement protrusion 133 of the cam slot frame 130, which is engaged with the translational groove of the fixed frame 170 is damaged. Further, there is a possibility that other members such as the first group cam follower 111, the cam follower 151, etc. are damaged. On the other hand, according to the foregoing configuration, little force in the rotational direction acts on the first group frame 110, the cam frame 150, and the cam slot frame 130, thereby reducing the possibility of causing the damage of the lens barrel 100.

Thus, the lens barrel 100 of the present embodiment the zoom optical system including the first to third lens groups 301-303 each having one or more lenses, in which the focal distance is changeable by moving the lens groups in the optical axis direction; the first group frame 110 moving together with the first lens group 301 closest to the object in the zoom optical system; and the first and second cam mechanisms transmitting drive force to the first group frame 110. Each of the first and second cam mechanisms includes the cam follower and the cam groove engaged with the cam follower and including the section in which each of the cam followers moves when the focal distance is changed between the wide-angle end and the tele end. The section of at least one of the cam grooves (cam slot 131) of the first and second cam mechanisms includes the first section 131a which has the predetermined gradient to the circumferential direction about the optical axis, the second section 131b which adjoins the first section 131a and has the absolute value of the gradient smaller than that of the first section 131a, and the third section 131c which adjoins the second section 131b and has the absolute value of the gradient larger than that of the second section 131b, and in which the sign of the gradient is the same as that of the first section 131a. The distance from the imaging surface 101a to the first group frame 110 in the optical axis direction has the local minimum in the second section 131b. According to such a configuration, when external force acts on the first group frame 110, and the first group frame 110 is pushed to the position where the distance from the imaging surface 101a to the first group frame 110 in the optical axis direction is the local minimum, acting of great force in the rotational direction on the first group frame 110 and other members associated therewith can be reduced. Thus, strength of the lens barrel 100 against external force can be improved.

In all of the cam grooves involved in the movement of the first group frame 110 in the optical axis direction, the portion where the corresponding cam follower is positioned when the distance from the imaging surface 101a to the first group frame 110 in the optical axis direction is the local minimum extends along the circumferential direction. Thus, force in the rotational direction, which acts on the first group frame 110 and all of the frames including the cam grooves can be reduced.

Each of the first group cam groove 210 which is the cam groove of the first cam mechanism, and the cam slot 131 which is the cam groove of the second cam mechanism includes the second section (flat section) in which the absolute value of the gradient is smaller than those of adjoining sections sandwiching the second section. In at least one of the first group cam groove 210 and the cam slot 131, the sign of the gradient is the same between the first and third sections which sandwich the second section.

Second Embodiment

Figure 3:
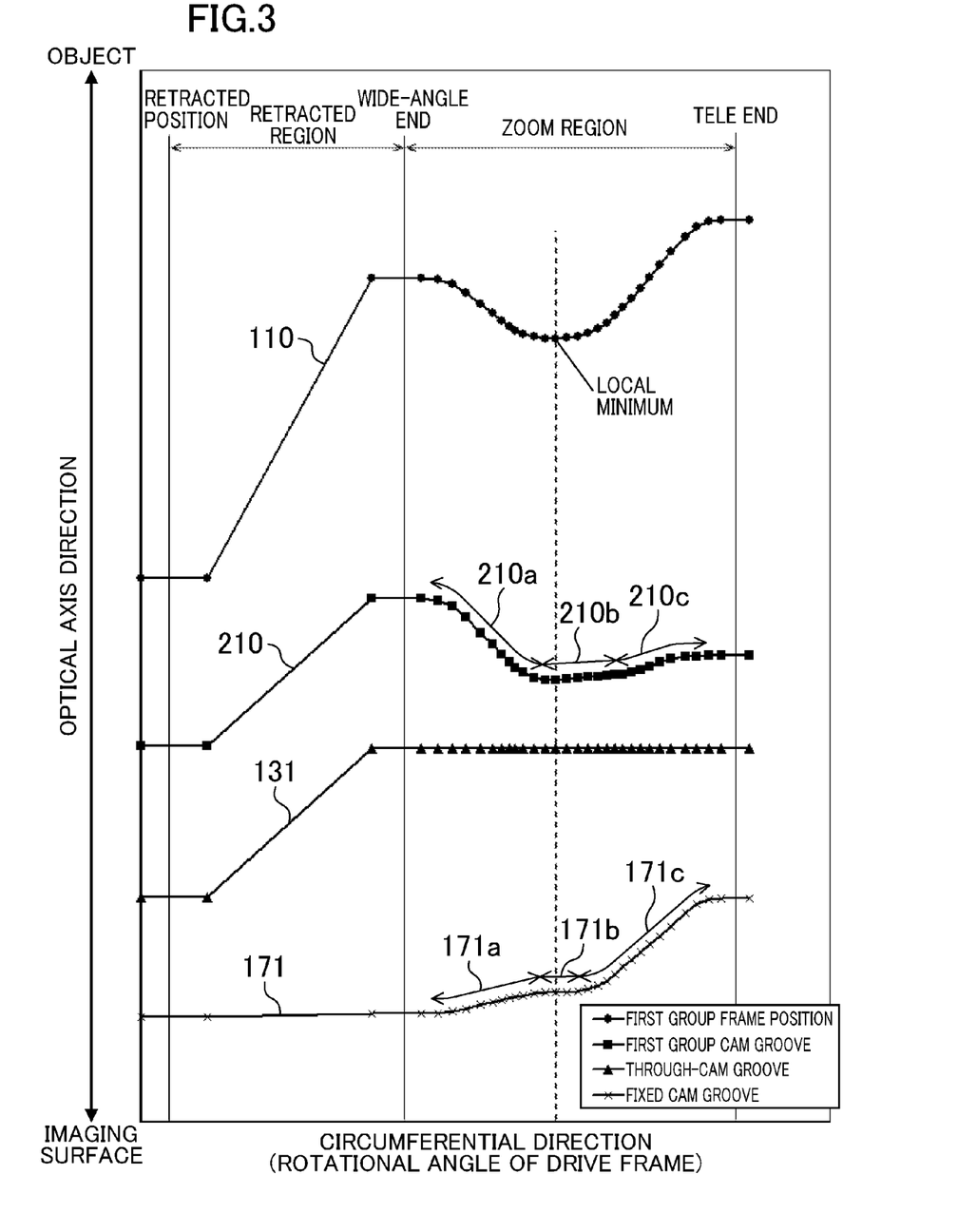
FIG. 3 illustrates a locus of a first group frame in an optical axis direction relative to a rotation amount, and development diagrams of a fixed cam groove, a cam slot, and a first group cam groove in a second embodiment.

Next, a lens barrel of a second embodiment will be described. FIG. 3 corresponds to FIG. 2. FIG. 3 illustrates a locus of a first group frame 110, and a development diagram of each of a fixed cam groove 171, a cam slot 131, and a first group cam groove 210. The lens barrel of the present embodiment is different from that of the first embodiment in shapes of a fixed cam groove 171 and a cam slot 131. Thus, the shapes of the fixed cam groove 171 and the cam slot 131 will be mainly described.

The fixed cam groove 171 obliquely and linearly extends from a retracted position to a wide-angle end and an object in a retracted region. However, a change amount in an optical axis direction is small in the retracted region. In a zoom region, the fixed cam groove 171 obliquely extends from the wide-angle end to a tele end and the object, and substantially extends parallel to a circumferential direction toward the tele end in the middle of the zoom region. Then, the fixed cam groove 171 obliquely extends toward the tele end and the object again, and reaches the tele end. Specifically, the fixed cam groove 171 in the zoom region includes the followings from the wide-angle end to the tele end: a first section 171a having a positive gradient, a second section 171b in which an absolute value of the gradient is smaller than that of the first section 171a, and a third section 171c in which a sign of the gradient is positive as in the first section 171a, and the absolute value of the gradient is larger than that of the second section 171b. More specifically, the second section 171b includes a portion which is substantially parallel to the circumferential direction. The first section 171a includes an inflection point at which a change in gradient is turned from an increase to a decrease. In addition, the second section 171b includes an inflection point at which the change in gradient is turned from the decrease to the increase. Further, the third section 171c includes an inflection point at which the change in gradient is turned from the increase to the decrease. That is, when a drive cam follower 161 moves along the fixed cam groove 171 from the wide-angle end to the tele end, the drive cam follower 161 moves toward the object in the optical axis direction, a displacement of the drive cam follower 161 in the optical axis direction becomes temporarily zero or extremely small, and the drive cam follower 161 moves toward the object in the optical axis direction again.

The cam slot 131 obliquely and linearly extends from the retracted position to the wide-angle end and the object in the retracted region. In the zoom region, the cam slot 131 substantially extends parallel to the circumferential direction from the wide-angle end to the tele end. That is, a cam follower 151 does not move in the optical axis direction while moving in the zoom region of the cam slot 131.

A shape of a first group cam groove 210 of the present embodiment is similar to that of the first embodiment.

As described above, in the zoom region, drive force in a rotational direction from a zoom motor unit 173 is transmitted to a drive frame 160 as drive force in the rotational direction and the optical axis direction through a second cam mechanism formed by the fixed cam groove 171 and the drive cam follower 161. Then, the drive force transmitted to the drive frame 160 is transmitted to the cam frame 150 without change through the cam slot 131 and the cam follower 151. Further, the drive force transmitted to the cam frame 150 is transmitted to a first group frame 110 as drive force in the optical axis direction through a first cam mechanism formed by the first group cam groove 210 and a first group cam follower 111. As a result, the first group frame 110 is driven in the optical axis direction. In the second embodiment, the first group frame 110 forms a first frame, and the drive frame 160 forms a second frame. In addition, a fixed frame 170 forms a third frame.

Third Embodiment

Figure 4:
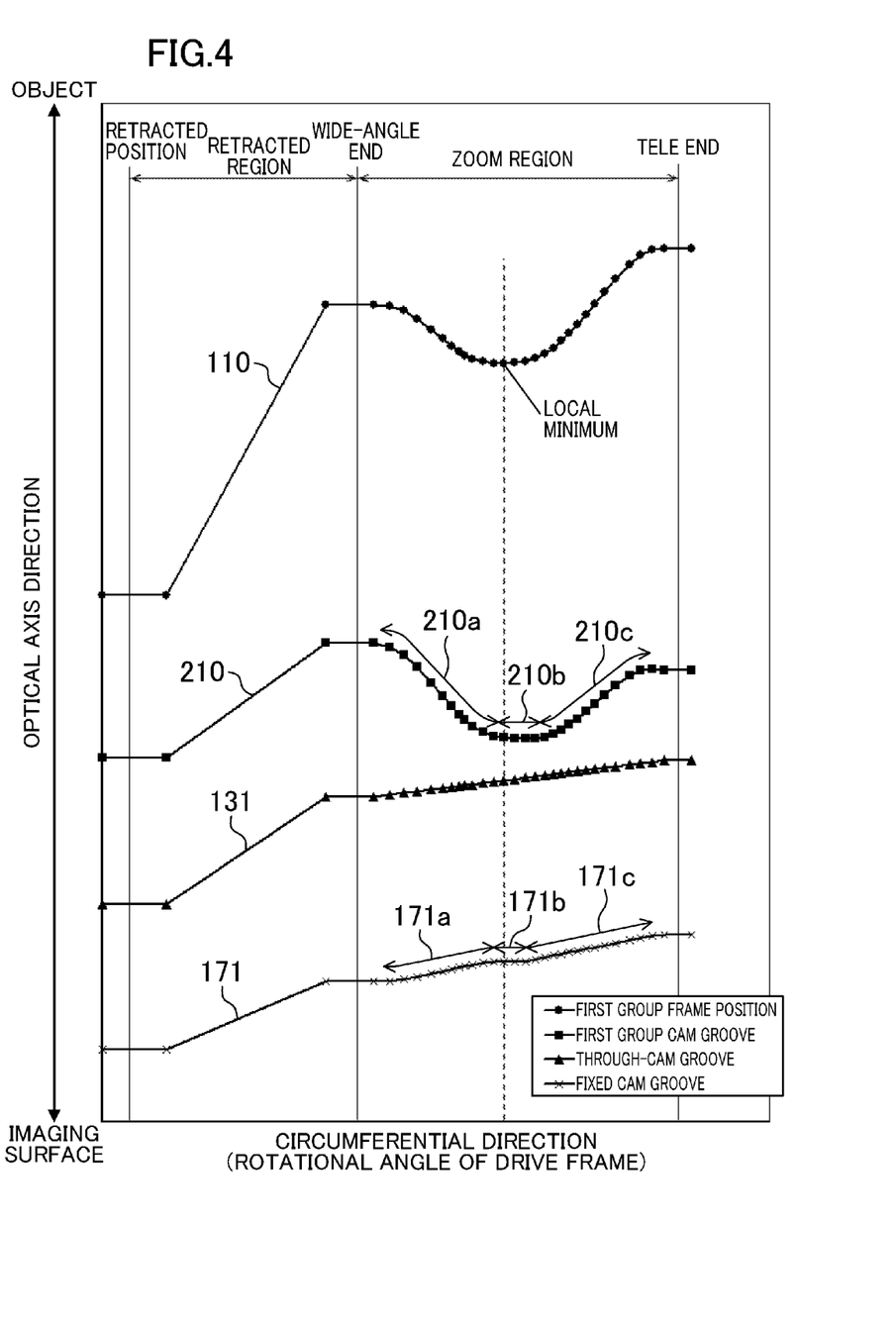
FIG. 4 illustrates a locus of a first group frame in an optical axis direction relative to a rotation amount, and development diagrams of a fixed cam groove, a cam slot, and a first group cam groove in a third embodiment.

Next, a lens barrel of a third embodiment will be described. FIG. 4 corresponds to FIG. 2. FIG. 4 illustrates a locus of a first group frame 110, and a development diagram of each of a fixed cam groove 171, a cam slot 131, and a first group cam groove 210. The lens barrel of the present embodiment is different from that of the first embodiment in shapes of a fixed cam groove 171 and a cam slot 131. Thus, the shapes of the fixed cam groove 171 and the cam slot 131 will be mainly described.

The fixed cam groove 171 obliquely and linearly extends from a retracted position to a wide-angle end and an object in a retracted region. However, a change amount in an optical axis direction is small in the retracted region. In a zoom region, the fixed cam groove 171 obliquely extends from the wide-angle end to a tele end and the object, and substantially extends parallel to a circumferential direction toward the tele end in the middle of the zoom region. Then, the fixed cam groove 171 obliquely extends toward the tele end and the object again, and reaches the tele end. Specifically, the fixed cam groove 171 in the zoom region includes the following from the wide-angle end to the tele end: a first section 171a having a positive gradient, a second section 171b in which an absolute value of the gradient is smaller than that of the first section 171a, and a third section 171c in which a sign of the gradient is positive as in the first section 171a, and the absolute value of the gradient is larger than that of the second section 171b. More specifically, the second section 171b includes a portion which is substantially parallel to the circumferential direction. The first section 171a includes an inflection point at which a change in gradient is turned from an increase to a decrease. In addition, the second section 171b includes an inflection point at which the change in gradient is turned from the decrease to the increase. Further, the third section 171c includes an inflection point at which the change in gradient is turned from the increase to the decrease. That is, when a drive cam follower 161 moves along the fixed cam groove 171 from the wide-angle end to the tele end, the drive cam follower 161 moves toward the object in the optical axis direction. Then, a displacement of the drive cam follower 161 in the optical axis direction becomes temporarily zero or extremely small, and the drive cam follower 161 moves toward the object in the optical axis direction again.

The cam slot 131 obliquely and linearly extends from the retracted position to the wide-angle end and the object in the retracted region. In the zoom region, the cam slot 131 obliquely extends from the wide-angle end to the tele end and the object.

Although a degree of the gradient is different between the present embodiment and the first embodiment, an entire shape of a first group cam groove 210 of the present embodiment is similar to that of the first embodiment.

As described above, in the zoom region, drive force in a rotational direction from a zoom motor unit 173 is transmitted to a drive frame 160 as drive force in the rotational direction and the optical axis direction through a second cam mechanism formed by the fixed cam groove 171 and the drive cam follower 161. Then, the drive force transmitted to the drive frame 160 is transmitted to the cam frame 150 as drive force in the rotational direction and the optical axis direction through the cam slot 131 and the cam follower 151. Further, the drive force transmitted to the cam frame 150 is transmitted to a first group frame 110 as drive force in the optical axis direction through a first cam mechanism formed by the first group cam groove 210 and a first group cam follower 111. As a result, the first group frame 110 is driven in the optical axis direction. In the third embodiment, the first group frame 110 forms a first frame, and the drive frame 160 forms a second frame. In addition, a fixed frame 170 forms a third frame.

Fourth Embodiment

Figure 5:
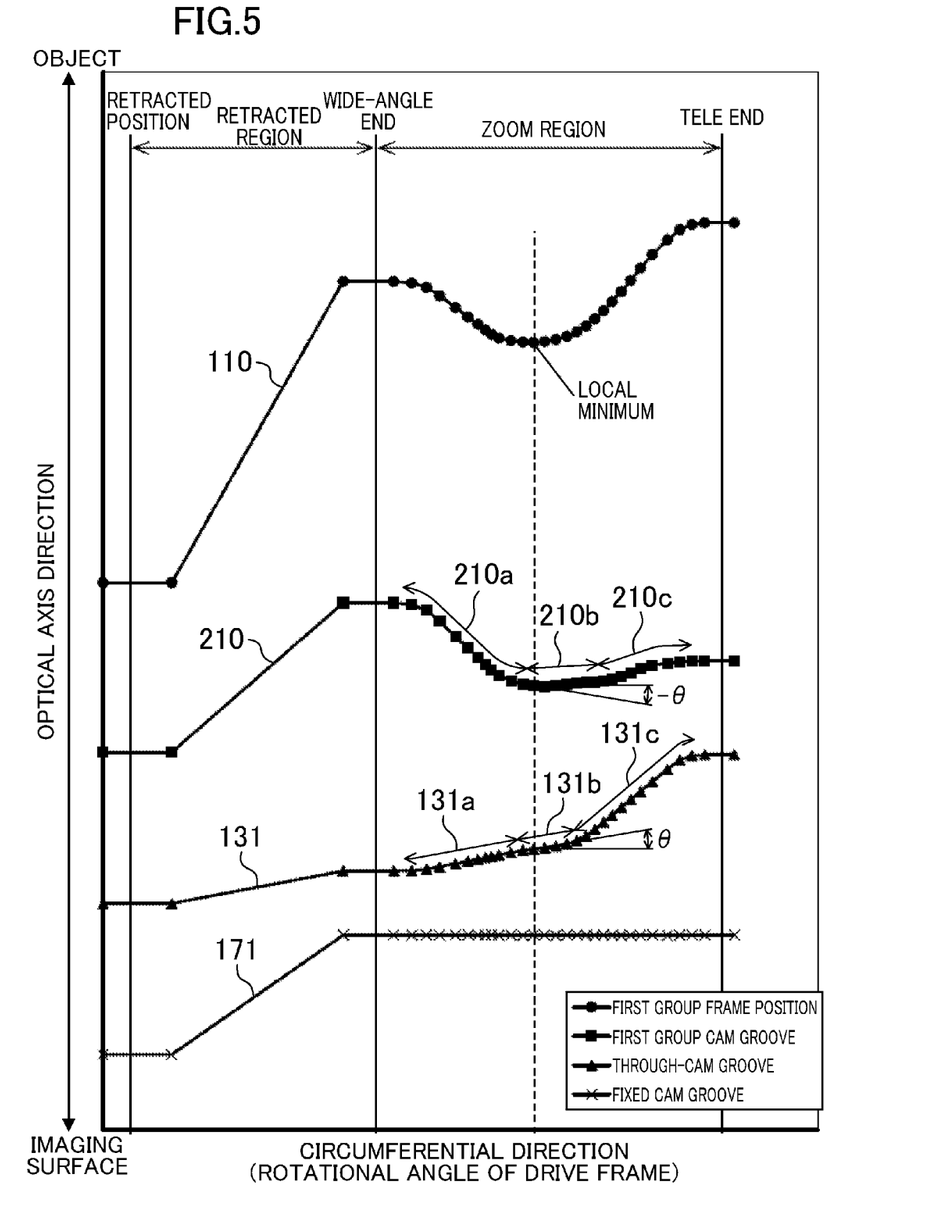
FIG. 5 illustrates a locus of a first group frame in an optical axis direction relative to a rotation amount, and development diagrams of a fixed cam groove, a cam slot, and a first group cam groove in a fourth embodiment.

Next, a lens barrel of a fourth embodiment will be described. FIG. 5 corresponds to FIG. 2. FIG. 5 illustrates a locus of a first group frame 110, and a development diagram of each of a fixed cam groove 171, a cam slot 131, and a first group cam groove 210. The lens barrel of the present embodiment is different from that of the first embodiment in shapes of a cam slot 131 and a first group cam groove 210. Thus, the shapes of the cam slot 131 and the first group cam groove 210 will be mainly described.

A shape of a fixed cam groove 171 of the present embodiment is similar to that of the first embodiment.

The cam slot 131 obliquely and linearly extends from a retracted position to a wide-angle end and an object in a retracted region. In addition, the cam slot 131 obliquely extends from the wide-angle end to a tele end and the object in the zoom region, and extends along a circumferential direction toward the tele end in the middle of the zoom region. Then, the cam slot 131 obliquely extends toward the tele end and the object again, and reaches the tele end. The present embodiment is similar to the first embodiment in that the cam slot 131 in the zoom region includes the following from the wide-angle end to the tele end: a first section 131a having a positive gradient, a second section 131b in which an absolute value of the gradient is smaller than that of the first section 131a, and a third section 131c in which a sign of the gradient is positive as in the first section 131a, and the absolute value of the gradient is larger than that of the second section 131b. However, in the first embodiment, the cam slot 131 in the second section 131b is substantially parallel to the circumferential direction. On the other hand, in the fourth embodiment, although the cam slot 131 in the second section 131b extends along the circumferential direction, the cam slot 131 is slightly inclined to the circumferential direction. In particular, at a point in the second section 131b, at which a distance from an imaging surface 101a to a first group frame 110 in the optical axis direction is a local minimum, an angle of inclination to the circumferential direction is θ.

The first group cam groove 210 obliquely and linearly extends from the retracted position to the wide-angle end and the object in the refracted region. In addition, the first group cam groove 210 obliquely extends from the wide-angle end to the tele end and the imaging surface in the zoom region, and then extends along the circumferential direction toward the tele end. Subsequently, the first group cam groove 210 obliquely extends toward the tele end and the object, and reaches the tele end. The present embodiment is similar to the first embodiment in that the first group cam groove 210 in the zoom region includes the following from the wide-angle end to the tele end: a first section 210a having a negative gradient, a second section 210b in which the absolute value of the gradient is smaller than that of the first section 210a, and a third section 210c in which the sign of the gradient is positive, and the absolute value of the gradient is larger than that of the second section 210b. However, in the first embodiment, the first group cam groove 210 in the second section 210b is substantially parallel to the circumferential direction. On the other hand, in the fourth embodiment, although the first group cam groove 210 in the second section 210b extends along the circumferential direction, the first group cam groove 210 is slightly inclined to the circumferential direction. In particular, at a point in the second section 210b, at which the distance from the imaging surface 101a to the first group frame 110 in the optical axis direction is the local minimum, the angle of inclination to the circumferential direction is −θ. That is, an inclination direction at such a point is opposite to an inclination direction of the second section 131b of the cam slot 131, and an absolute value of such an inclination is the same between the second section 210b of the first group cam groove 210 and the second section 131b of the cam slot 131. This results in the local minimum for the distance from the imaging surface 101a to the first group frame 110 in the optical axis direction at the foregoing point.

As in the foregoing case, the second sections 131b, 210b in which the angle of inclination is gradual (i.e., the absolute value of the gradient is smaller than those of adjoining sections) are provided in the cam slot 131 and the first group cam groove 210, respectively. Thus, when external force in the optical axis direction acts on the first group frame 110, force in a rotational direction, which acts on the first group frame 110 and other members associated therewith can be reduced as compared to a case where the second sections 131b, 210b are not provided. This improves strength of the lens barrel 100 against external force.

A coefficient of dynamic friction μ between a cam follower and a cam groove, and the angle of inclination θ are set so as to satisfy a relationship of $\tan\theta \leq \mu$. Thus, when external force in the optical axis direction acts on the first group frame 110, force in the rotational direction, which acts on the first group frame 110 and other frames associated therewith can be further reduced. That is, by satisfying the relationship represented by the foregoing expression, friction force between the cam follower and the cam groove becomes larger than force rotating the frame, and therefore force in the rotational direction, which acts on the frame can be further reduced. When the coefficient of dynamic friction μ is, e.g., about 0.2, the angle of inclination θ may be equal to or less than about 11.3 degrees. When the coefficient of dynamic friction μ is about 0.1, the angle of inclination θ may be equal to or less than about 5.7 degrees. Fluorine lubricant etc. having a small coefficient of friction may be used for the lens barrel 100. If such lubricant is used, the coefficient of dynamic friction μ is about 0.05-0.1. In such a case, if μ=0.1, it is preferred that the angle of inclination θ is equal to or less than about 5.7 degrees.

Other Embodiment

The foregoing embodiments may have the following configurations.

That is, a configuration of the lens barrel 100 is not limited to the foregoing configurations. Any configurations may be employed in the lens group and the frame.

The first group frame 110 moves according to the shapes of the fixed cam groove 171, the cam slot 131, and the first group cam groove 210, but the present disclosure is not limited to such a configuration. A configuration may be employed, in which the first group frame 110 moves according to a cam groove provided in a frame other than the fixed cam frame 170, the cam slot frame 130, and the first group cam frame 110.

In the first and fourth embodiments, the second sections 210b, 131b in which the absolute value of the gradient is smaller than those of the adjoining sections are provided in both of the first group cam groove 210 and the cam slot 131, but the present disclosure is not limited to such a configuration. For example, a section in which an absolute value of the gradient is smaller that those of adjoining sections may be provided in either one of the first group cam groove 210 and the cam slot 131, and a cam follower may be positioned in such a section when the distance from the imaging surface 101a to the first group frame 110 in the optical axis direction is the local minimum. Even in such a configuration, an advantage can be realized, in which force in the rotational direction, which acts on the first group frame 110 and the frames associated therewith can be reduced. In addition, in the second and third embodiments, the second sections 210b, 171b in which the absolute value of the gradient is smaller than those of the adjoining sections are provided in both of the first group cam groove 210 and the fixed cam groove 171, but the present disclosure is not limited to such a configuration. As described above, the section in which the absolute value of the gradient is smaller that those of the adjoining sections may be provided in either one of the first group cam groove 210 and the fixed cam groove 171, and the cam follower may be positioned in such a section when the distance from the imaging surface 101a to the first group frame 110 in the optical axis direction is the local minimum.

In the foregoing embodiments, each of the first group cam groove 210, the cam slot 131, and the fixed cam groove 171 includes the portion which substantially extends parallel to the circumferential direction, but such a portion is not necessarily parallel to the circumferential direction. That is, the portion may be extend along the circumferential direction.

In the foregoing embodiments, each of the cam grooves of the first and second cam mechanisms includes the second section in which the absolute value of the gradient is smaller than those of the adjoining sections sandwiching the second section. In one of the second sections, the sign of the gradient is the same between the first and third sections which sandwich the second section. In the other second section, the sign of the gradient is opposite between the first and third sections which sandwich the second section. However, the present disclosure is not limited to such a configuration. In both of the second sections of the cam grooves of the first and second cam mechanisms, the sign of the gradient may be the same between the first and third sections which sandwich the second section.

As described above, the present disclosure is useful for the lens barrel.

The description of the embodiments of the present disclosure is given above for the understanding of the present disclosure. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A lens barrel, comprising:
a zoom optical system including a plurality of lens groups each having one or more lenses, in which a focal distance is changeable between a wide-angle end and a tele end by moving the lens groups along an optical axis;
a first frame moving together with a first lens group of the plurality of lens groups and which is closest to an object in the zoom optical system; and
first and second cam mechanisms transmitting drive force to the first frame,
wherein each of the first and second cam mechanisms includes a cam follower and a cam groove engaged with the cam follower, the cam groove including a section in which the cam follower moves when the focal distance is changed between the wide-angle end and the tele end, the section of at least one of the cam grooves of the first and second cam mechanisms includes a first section which has a predetermined gradient to a circumferential direction about the optical axis, a second section which adjoins the first section and has an absolute value of a gradient smaller than that of the first section, and a third section which adjoins the second section and has an absolute value of a gradient larger than that of the second section, and in which a sign of the gradient is the same as that of the first section, and
a distance from an imaging surface to the first frame in the optical axis direction has a local minimum when the cam follower for the at least one of the cam grooves is positioned within the second section.

2. The lens barrel of claim 1, wherein
a portion of the second section in which the cam follower for the at least one of the cam grooves is positioned when the distance to the first frame is the local minimum is parallel to a plane perpendicular to the optical axis.

3. The lens barrel of claim 1, wherein
a portion of the cam groove of each of the first and second cam mechanisms, in which the cam follower is positioned when the distance from the imaging surface to the first frame is the local minimum is parallel to a plane perpendicular to the optical axis.

4. The lens barrel of claim 1, further comprising:
second and third frames,
wherein the second cam mechanism moves the second frame relative to the third frame, and
the first cam mechanism moves the first frame relative to the second frame.

* * * * *